(12) United States Patent
Bi et al.

(10) Patent No.: US 8,767,611 B2
(45) Date of Patent: Jul. 1, 2014

(54) METHOD FOR INDICATING AND DETERMINING RELAY LINK BOUNDARY AND BASE STATION THEREOF

(75) Inventors: Feng Bi, Shenzhen (CN); Feng Liang, Shenzhen (CN); Ming Yuan, Shenzhen (CN); Jin Yang, Shenzhen (CN); Shuanshuan Wu, Shenzhen (CN); Yifei Yuan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/259,015

(22) PCT Filed: Dec. 28, 2010

(86) PCT No.: PCT/CN2010/080362
§ 371 (c)(1),
(2), (4) Date: Aug. 17, 2012

(87) PCT Pub. No.: WO2011/120320
PCT Pub. Date: Oct. 6, 2011

(65) Prior Publication Data
US 2013/0044673 A1 Feb. 21, 2013

(30) Foreign Application Priority Data
Apr. 2, 2010 (CN) .......................... 2010 1 0162624

(51) Int. Cl.
*H04B 7/14* (2006.01)
*H04B 7/26* (2006.01)

(52) U.S. Cl.
CPC ............ *H04B 7/2609* (2013.01); *H04B 7/2606* (2013.01); *H04B 7/14* (2013.01)
USPC ............ 370/315; 370/336; 370/329; 370/252

(58) Field of Classification Search
CPC ....... H04B 7/2609; H04B 7/2606; H04B 7/14
See application file for complete search history.

(56) References Cited

U.S. PATENT DOCUMENTS

2009/0252134 A1* 10/2009 Schlicht et al. ............... 370/338
2010/0202322 A1 8/2010 Cai et al.
(Continued)

FOREIGN PATENT DOCUMENTS

CN 101291473 A 10/2008
CN 101827356 A 9/2010
(Continued)

OTHER PUBLICATIONS

ZTE, Huawei, Nokia, NSN, Ericsson, ST-Ericsson, Panasonic, CATT, Qualcomm Incorporated, Samsung, ETRI, CATR et al. titled, "WF on R-PDCCH Starting Symbol," was presented as Proposals, 3GPP TSG RAN WG1 #60, Document No. R1-101647, in San Francisco, CA, Feb. 22-26, 2010, , pp. 01-02.*

(Continued)

*Primary Examiner* — Andrew Lai
*Assistant Examiner* — Hoyet H Andrews
(74) *Attorney, Agent, or Firm* — Christopher L. Parmelee; Walker & Jocke

(57) ABSTRACT

The present invention discloses a method for indicating and determining relay link boundary and a base station thereof, wherein, the method for indicating relay link boundary includes: the base station indicates the relay link boundary where the relay node is located to the relay node; the relay node determines the relay link boundary according to the indication of the base station. Through the present invention, the utilization rate of the relay link resource can be improved.

32 Claims, 4 Drawing Sheets

(56) References Cited

U.S. PATENT DOCUMENTS

| | | | |
|---|---|---|---|
| 2012/0020307 A1* | 1/2012 | Henderson et al. | 370/329 |
| 2012/0033588 A1* | 2/2012 | Chung et al. | 370/280 |
| 2012/0093082 A1* | 4/2012 | Kim et al. | 370/328 |
| 2012/0106372 A1* | 5/2012 | Gaal et al. | 370/252 |
| 2012/0106438 A1* | 5/2012 | Kwon et al. | 370/315 |
| 2012/0113884 A1* | 5/2012 | Park et al. | 370/312 |
| 2012/0134275 A1* | 5/2012 | Choi et al. | 370/241 |
| 2012/0140726 A1* | 6/2012 | Moon et al. | 370/329 |
| 2012/0188907 A1* | 7/2012 | Dayal et al. | 370/254 |
| 2012/0201163 A1* | 8/2012 | Jongren et al. | 370/252 |
| 2012/0281588 A1* | 11/2012 | Damnjanovic | 370/252 |
| 2012/0287900 A1* | 11/2012 | Seo et al. | 370/329 |
| 2012/0320782 A1* | 12/2012 | Seo et al. | 370/252 |
| 2013/0077543 A1* | 3/2013 | Kim et al. | 370/281 |
| 2013/0083753 A1* | 4/2013 | Lee et al. | 370/329 |
| 2013/0107828 A1* | 5/2013 | Dinan | 370/329 |
| 2013/0114562 A1* | 5/2013 | Seo et al. | 370/329 |
| 2013/0148513 A1* | 6/2013 | Szabo et al. | 370/252 |
| 2013/0170396 A1* | 7/2013 | Dinan | 370/254 |
| 2013/0176933 A1* | 7/2013 | Seo et al. | 370/312 |
| 2013/0188589 A1* | 7/2013 | Nakashima et al. | 370/329 |

FOREIGN PATENT DOCUMENTS

| | | |
|---|---|---|
| CN | 101888661 A | 11/2010 |
| WO | 2008124985 A1 | 10/2008 |

OTHER PUBLICATIONS

LG Electronics Inc., titled, "Consideration on Uplink Backhaul Channels in LTE-A," was presented as Agenda Item: 7.5.1, 3GPP TSG RAN WG1 Meeting #59b, Document No. R1-100232, in Valencia, Spain, Jan. 18-22, 2010, pp. 01-03 teaches consideration on Uplink Backhaul Channels in LTE-A.*

LG Electronics, Huawei, Ericsson, ST Ericsson, ZTE, ETRI, RIM, HTC, Mitsubishi Electric, Panasonic, Samsung, CATT et al. titled, "WF on timing of backhaul and access link in uplink," was presented as Agenda Item: 7.5.1, 3GPP TSG RAN WG1 #59b, Document No. R1-100807, in Valencia, Spain, Jan. 18-22, 2010, pp. 01-03.*

ZTE, titled, "Timing alignment of access and backhaul link," was presented as Agenda Item: 7.5.1, 3GPP TSG RAN WG1 #59bis, Document No. R1-100538, in Valencia, Spain, Jan. 18-22, 2010, pp. 01-05.*

Steven W Peters, Ali Y Panah, Kien T Truong and Robert W Heath et al., "Relay Architectures for 3GPP LTE-Advanced," EURASIP Journal on Wireless Communications and Networking 2009, 2009:618787 doi:10.1155/2009/618787, pp. 01-14, Jul. 13, 2009.*

Alcatel-Lucent, titled "System Design Frameworks to Support Type II Relay Operation in LTE-A," (Alcatel-Lucent hereinafter) was presented as Agenda Item-15.3, 3GPP TSG RAN WG1 #58, Document No. R1-093355, in Shenzhen, China, Aug. 24-28, 2009, pp. 01-11.*

LG Electronics Inc., titled Support of Synchronization between eNB-UE and RN-UE link, (LG Electronics hereinafter) was presented as Agenda Item-7.5.1, 3GPP TSG RAN WG1 #59b, Document No. R1-100752, in Valencia, Spain, Jan. 18-22, 2010, pp. 01-03.*

ETRI, titled "Timing of backhaul and access links in uplink," (ETRI hereinafter) was presented as Agenda Item: 7.5.1.1, 3GPP TSG RAN WG1 Meeting #60, Document No. R1-101392, San Francisco, USA, Feb. 22-26, 2010, pp. 01-03.*

ZTE, titled, "Timing alignment of access and backhaul link," (ZTE hereinafter) was presented as Agenda Item: 7.5.1, 3GPP TSG RAN WG1 #59bis, Document No. R1-100538, in Valencia, Spain, Jan. 18-22, 2010, pp. 01-05.*

* cited by examiner

METHOD FOR INDICATING AND DETERMINING RELAY LINK BOUNDARY AND BASE STATION THEREOF

FIELD OF THE INVENTION

The present invention relates to the communication field, and more specifically, to a method for indicating and determining relay link boundary and a base station thereof.

BACKGROUND OF THE INVENTION

In the Long-term Evolution-Advanced (LTE-A) wireless communication system containing a Relay Node (RN), as shown in FIG. 1, the link between the base station (eNodeB, eNB for short) and the relay node is referred to as backhaul link or relay link, the link between the relay node and UE is referred to as access link, and the link between the eNodeB and UE is referred to as direct link. LTE-A is based on Orthogonal Frequency Division Multiplexing (OFDM). Time-frequency two dimensional data type dominates in OFDM system. In LTE-A, Resource Block (RB for short, resource block mapped onto physical resource block is known as Physical Resource Block (PRB)) is fixed as OFDM symbol in time domain within continuous 1 slot and in frequency domain within continuous 12 or 24 subcarriers, so 1 RB consists of $N_{symb} \times N_{sc}^{RB}$ Resource Elements (RE), wherein $N_{symb}$ means the number of OFDM symbols in 1 slot, $N_{sc}^{RB}$ means the number of continuous subcarriers of resource block in frequency domain. Namely, resource block refers to all OFDM symbols occupying several subcarriers (for example, 12 subcarriers) in frequency direction and 1 slot in time direction; resource block pair refers to a pair of resource blocks corresponding to 2 slots within 1 subframe. For instance, in the frame structure shown in FIG. 2, 1 radio frame includes 10 subframes, while each subframe consists of 2 slots. For normal cyclic prefix, 1 slot includes 7 OFDM symbols; for extended cyclic prefix, 1 slot includes 6 OFDM symbols.

Currently, in inband-relay mode, to save the power of the User Equipment (UE), the system adopts Time Division Multiplex (TDM) for operation, namely, the control channel and traffic channel are separated in time. For instance, in the frame structure shown in FIG. 2, there are 14 OFDM symbols in one subframe, the former 1 or 2 or 3 or 4 OFDM symbols are as control channel, and the latter 13 or 12 or 11 or 10 OFDM symbols are as traffic channel, also as the control channel, traffic channel of the relay link. Due to receiving-transmission self interference, a guard space at receiving/transmission or transmission/receiving position is required for receiving/transmission or transmission/receiving switching. Moreover, the symbol number for the Physical Downlink Control Channel (PDCCH) used by the eNB and RN changes dynamically, so the relay node cannot determine the specific starting position of specific control information. The solution of related art to this is as below: when the number of the downlink resource blocks is no more than 10, the Relay link-Physical Downlink Control Channel (R-PDCCH) starts from the 5th OFDM symbol, otherwise it starts from the 4th OFDM symbol, or starts from the 4th or 5th OFDM symbol in both cases. In LTE/LTE-A system, the Control Channels Elements (CCE) are used to carry the Downlink Control Information (DCI) or Relay link-Downlink Control Information (R-DCI).

However, the inventor finds that, except that of R-PDCCH, the starting position (namely, boundary) of the resource available to other relay links has not been fixed in related art, leading to low utilization rate of relay link resource. For example, since the starting position of Relay link-Physical Downlink Shared Channel (R-PDSCH) is not fixed in related art, to make sure the successful transmission of R-PDSCH, the R-PDSCH will be transmitted as late as possible, for instance, after R-PDCCH, thus wasting the relay link resource before the starting position of R-PDCCH. When carrying the data at R8 or R9 or R10 terminal, the shared channel is PDSCH; when carrying RN data, the shared channel is R-PDSCH for differentiation. It shall be noted that the PDSCH and R-PDSCH resources available are the same.

SUMMARY OF THE INVENTION

The present invention provides a method for indicating relay link boundary to solve at least one of the problems above.

According to one aspect of the present invention, a method for indicating relay link boundary is provided, comprising: a base station indicating, to a relay node, the relay link boundary corresponding to the relay node; and the relay node determining the relay link boundary according to the indication of the base station.

According to another aspect of the present invention, a method for determining relay link boundary is provided, comprising: a relay node determining the relay link boundary corresponding to the relay node according to an indication from a base station or a prior agreement with the base station.

According to another aspect of the present invention, a base station is provided, comprising: a determination module and an indication module, wherein the former is used to determine a relay link boundary corresponding to a relay node, the latter is used to indicate the relay link boundary to the relay node.

According to the present invention, by means of the base station which indicates the relay link boundary of relay node, the idle resource of the relay link can all be effectively utilized, so as to improve the utilization rate of the relay link resource.

BRIEF DESCRIPTION OF THE DRAWINGS

The accompanying drawings disclosed herein, constituting a part of the Description for further understanding the present invention, illustrate the present invention together with the exemplary embodiments and the description without limiting the present invention, wherein.

DETAILED DESCRIPTION OF THE EMBODIMENTS

The present invention will be further illustrated hereinafter in conjunction with the exemplary embodiments and accompanying drawings. It shall be noted that the embodiments in this application and the features in the embodiments can be mutually combined if no conflict appears.

Figure 1:
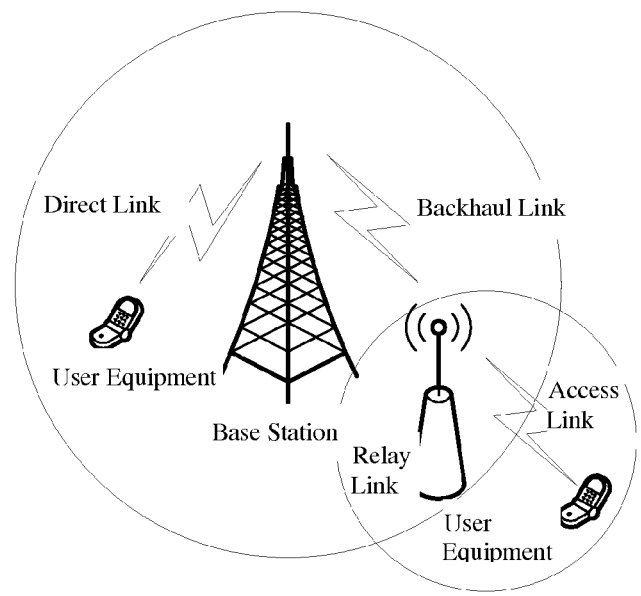
FIG. 1 is a schematic view of the system framework containing an RN according to related art.
Figure 2:
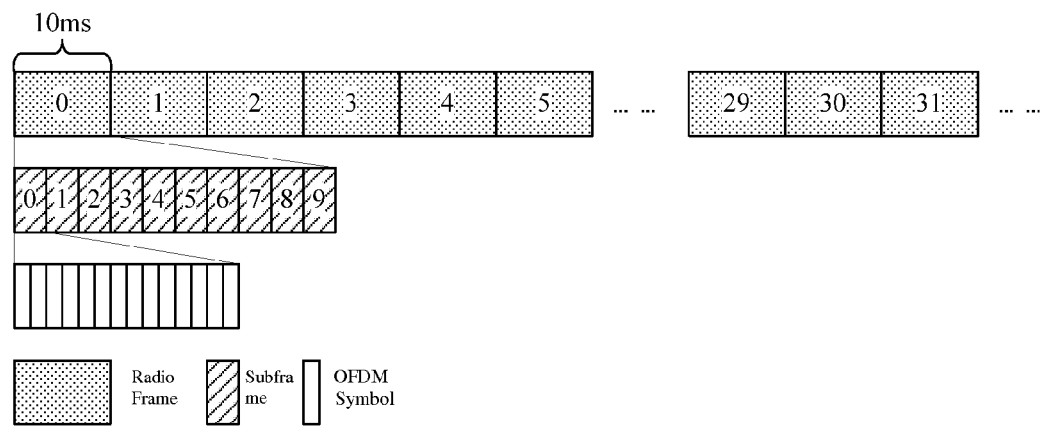
FIG. 2 is a schematic view of the frame structure according to related art.
Figure 3:
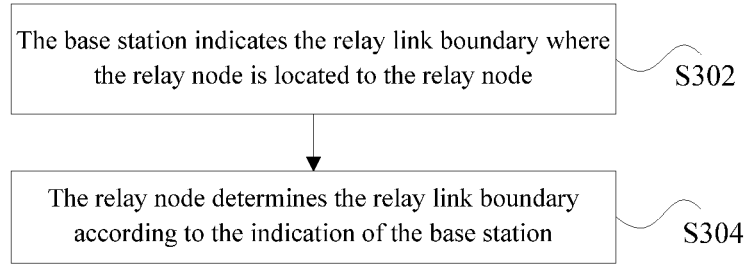
FIG. 3 is a flow chart of the method for indicating the relay link boundary according to the embodiments of the present invention.

FIG. 3 is a flow chart of the method for indicating the relay link boundary according to the embodiments of the present invention, wherein the method mainly includes the following steps (Step S302-S304):

Step S302, the base station indicates, to the relay node, the relay link boundary corresponding to the relay node;

namely, the base station indicates the starting position of other resource available to relay links other than that of R-PDCCH to the relay node; in specific application, the base station can indicate the position in either explicit or implicit way; the indication method adopted by the base station will be further illustrated hereinafter.

Step S304, the relay node determines the relay link boundary according to the indication of the base station.

According to the method above provided by the embodiments of the present invention, the base station can indicate the relay link boundary to the relay node, which features lowered signaling overhead and improved utilization rate of the relay link resource.

In the implementation, the method by which the base station indicates the relay link boundary of the relay node includes, but not limited to the following three modes:

Mode 1, the base station transmits indication information to the relay node to indicate the relay link boundary by means of the indication information, wherein the indication information indicates a symbol position corresponding to the relay link boundary;

in this mode, the base station can directly indicate the relay link boundary of the relay node according to the state of the relay node so as to improve the utilization rate of the relay link resource.

Mode 2, the base station transmits indication information to the relay node, and the indication information and a Physical Downlink Control Channel (PDCCH) symbol number used by an access link of the relay node are used to indicate the relay link boundary, wherein the indication information and the PDCCH symbol number jointly indicate a symbol position corresponding to the relay link boundary;

in this mode, the PDCCH symbol number can be together used for indication so as to reduce the bits occupied by the indication information and save resource.

Mode 3, the base station and the relay node adopt fixed symbol position as relay link boundary according to their prior agreement, and the base station implicitly indicates the fixed symbol position to the relay node rather than directly indicates the relay link boundary of the relay node. In specific application, the base station and relay node can arrange that the starting position of the resource available to relay link is the same with that of R-PDCCH. By adopting this mode for indication, additional signaling interaction between the base station and relay node is not required, thus reducing the signaling overhead.

When indication is conducted by Mode 1 or 2, the indication information can be transmitted by multiple ways. The transmission ways of indication information are illustrated hereinafter respectively.

In a preferred embodiment of the present invention, one way, through which the base station transmits the indication information above to the relay node, is as follows: the base station transmits indication information by means of high-level signaling (such as that called the Backhaul-DL-starting symbol), namely, the base station transmits the indication information to the relay node by carrying it in high-level signaling. For instance, the base station can add certain quantity of bits in high-level signaling, through which the indication information is carried, in this way to avoid the revision of physical layer protocol.

In a preferred embodiment of the present invention, another way, through which the base station transmits the indication information above to the relay node, is as follows: the base station transmits indication information by means of Relay link-Downlink Control Information (R-DCI), namely, the base station transmits the indication information to the relay node by carrying it in R-DCI. For instance, the base station can add certain quantity of bits in R-DCI, through which the indication information is carried, in this way to extend the R-DCI carried indication information and avoid the additional signaling between the base station and the relay node.

In a preferred embodiment of the present invention, another way, through which the base station transmits the indication information above to the relay node, is as follows: the base station transmits the indication information by means of fixed physical resource. In implementation, the base station can carry the indication information above on the fixed frequency resource in OFDM symbols with the same starting position of R-PDCCH, wherein the mapping method of the fixed frequency resource can be determined by the frequency resource mapping method of the Physical Control Format Indicator Channel (PCFICH) from the base station to the user equipment link, or distribute the indication information uniformly to the frequency resource scope available to R-PDCCH by regarding the frequency resource available to R-PDCCH as logic continuation. By this mode, the base station can transmit indication information on the physical resource reaching convention with the relay node, thus avoiding the revision of current signaling.

In a preferred embodiment of the present invention, the base station can transmit indication information to the relay node by means of relay node identification (RN-ID) scrambling. In specific application, when the base station transmits control information to the relay node after notifying the node identification to the relay node, it uses indication information to scramble the RN-ID in control information, and carry the RN-ID scrambled into control information and then transmit it to the relay node which further detects the indication information from the RN-ID scrambled by analysis after receiving the RN-ID scrambled. For instance, the base station can conduct "Exclusive OR" operation to the indication information with one or more bits of the RN-ID, and take the results obtained as the RN-ID scrambled. For example, if the indication information is 1 bit, the "Exclusive OR" operation can be conducted between the indication information and the last bit of the RN-ID, the RN-ID of the operating result is taken as the RN-ID scrambled and then carried in control information for transmitting to the relay node. By this method, additional bit is not required for carrying indication information, thus saving the signaling overhead.

In a preferred embodiment of the present invention, the base station can also indicate the relay link boundary corresponding to the relay node implicitly indicated by CCE index or resource block index. In specific application, when the base station distributes resource block or R-DCI for the relay node, the resource block or R-DCI transmitting to the relay node will indicate the indication information above through the index corresponding to the resource block or the index corresponding to CCE. For instance, the base station can reach an agreement with the relay node, when the resource block index is an even number, the value taken for indication information is "0", namely, indicate the 1st OFDM symbol of the relay link boundary. By this mode, additional bit is not required for the base station to carry indication information, thus saving the signaling overhead.

In implementation, if the base station uses the indication information and the PDCCH symbol number used by the access link for jointly indicating the relay link boundary, the PDCCH symbol number used by the access link can be configured by the base station or reported by the relay node, or the relay node can also reach an agreement with the base station for defining the PDCCH symbol number used by the access link, or the relay node can also reach an agreement with the base station for defining the PDCCH symbol number used by the access link in the time division mode, or the relay node determines the PDCCH symbol number used by the access link according to the number of its transmitting antenna.

In specific application, if the PDCCH symbol number used by the access link is configured by the base station, then in a preferred embodiment of the present invention, the base station will also transmit the identification for indicating the PDCCH symbol number to the relay node so that the relay node can determine the relay link boundary. For instance, the base station can transmit the identification above to the relay node by one of the following means: the base station transmits the identification through the common information of the Relay link-Downlink Broadcast Information (R-PBCH), for example, the base station can carry 1 bit of common information on the R-PBCH for indicating the identification; the base station can transmit the identification through the R-SIB common information, e.g., the base station can carry 1 bit of common information on the Relay link-System Information Block (R-SIB) for indicating the identification; the base station can transmit the identification through the common information of Radio Resource Control (RRC) signaling, e.g., carry 1 bit of common information on the RRC for indicating the identification; the base station can transmit the identification through the dedicated information of RRC, e.g., the base station can carry 1 bit of dedicated information to indicate the identification. In specific application, the base station can indicate the PDCCH symbol number used by the access link to be 1 through "0", and "1" indicates that the PDCCH symbol number used by the access link is 2, and vice verse.

If the PDCCH symbol number used by the access link is reported to the base station by the relay node, the relay node can report the identification of the PDCCH symbol number to be indicated on the common PRB or service packet. In specific application, the PDCCH symbol number used by the access link is generally 1 or 2. Therefore, the PDCCH symbol number used by the access link can be indicated by carrying 1 bit of dedicated information on the common PRB or service packet. For instance, if the bit value is "0", the PDCCH symbol number used by the access link is indicated to be 1; if the bit value is "1", the PDCCH symbol number used by the access link is indicated to be 2, and vice verse. As a result, the resource occupied by the identification for indicating the PDCCH symbol number used by the access link can be reduced.

If the relay node reports the identification for indicating the PDCCH symbol number to the base station through carrying dedicated information on common PRB, the relay node can reserve the resource carrying the dedicated information by one of FDM, CDM and TDM or any combination of them; if the relay node reports the identification for indicating the PDCCH symbol number to the base station by carrying dedicated information on a service packet, the identification can be transmitted via carrying it behind the service packet, or carrying it on the Media Access Control (MAC) layer of the service packet, or carrying it on the RRC signaling. In this way, the relay node can flexibly select the mode for reporting the PDCCH symbol number used by the access link according to the actual need.

In a preferred embodiment of the present invention, if the relay node fixes the PDCCH symbol number used by the access link, the base station will not need the configuration of the PDCCH symbol number used by the access link or the relay node will not need to report the PDCCH symbol number used by the access link, namely, the relay node fixes the PDCCH symbol number used by the access link to be 1 or 2. In this way, the signaling overhead between the base station and relay node can be reduced.

In a preferred embodiment of the present invention, if the relay node fixes the PDCCH symbol number used by the access link in the time division mode, the relay node changes the PDCCH symbol number used by the access link at a fixed change interval by taking the same or different subframes or radio frames as starting point. In this way, the signaling overhead between the base station and relay node can be reduced.

In a preferred embodiment of the present invention, the relay node can determines the PDCCH symbol number used by the access link according to the number of its transmitting antennae. For instance, if the relay node uses one or two transmitting antennae, the PDCCH symbol number used by the access link is 1; if the relay node uses four transmitting antennae, the PDCCH symbol number used by the access link is 2. By this mode, it is not required for the base station and relay node to notify the PDCCH symbol number to each other by signaling interaction, thus reducing the signaling overhead.

Corresponding to the method above for indicating the relay link boundary, the embodiments of the present invention also provide a method for determining the relay link boundary, wherein the method includes: the relay node determines the relay link boundary corresponding to the relay node according to the indication of the base station or the convention reached with the base station in advance. For instance, the relay node reaches an agreement with the base station that the starting position of the relay link is the same with that of the PDCCH of the relay link.

Figure 4:
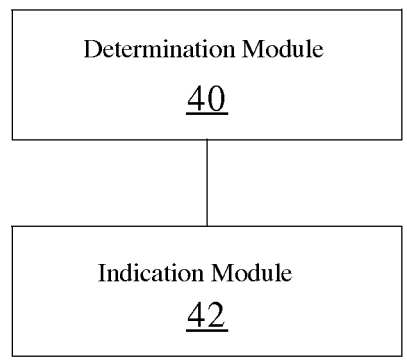
FIG. 4 is a schematic view of the structure of the base station according to the embodiments of the present invention.

Corresponding to the method above for indicating the relay link boundary, the embodiments of the present invention further provide a base station. FIG. 4 shows the schematic view of the structure of the base station. The base station can be used to realize the method above for indicating the relay link boundary provided by the embodiments of the present invention, wherein the base station includes: a determination module 40 and an indication module 42. The determination module 40 is used to determine the relay link boundary corresponding to the relay node; the indication module 42 is used to indicate the relay link boundary to the relay link.

Through the base station above, the relay link boundary can be indicated to the relay node so as to improve the utilization rate of the relay link resource.

In specific application, the indication module 42 can indicate the relay link boundary by the modes described in the method for indicating the relay link boundary above. For instance, the indication module 42 can indicate the relay link boundary by any one of the following means:

(1) The indication module 42 transmits indication information to the relay node, through which the relay link boundary is indicated;

(2) The indication module 42 transmits indication information to the relay node, and the relay link boundary is indicated by the indication information together with the PDCCH symbol number used by the access link of the relay node;

(3) The indication module 42 reaches an agreement with the relay node for the symbol position corresponding to the relay link boundary. From the three means above, the base station can select one suitable for the actual situation to indicate the relay node.

In a preferred embodiment of the present invention, the PDCCH symbol number used by the access link of the relay node can be configured by the relay node or the base station, so the base station in the preferred embodiment of the present invention can further include: a configuration module and a transmission module, wherein the former is used to configure the PDCCH symbol number used by the access link of the relay node; the latter is used to transmit the identification for indicating the PDCCH symbol number configured by the configuration module to the relay node.

The present invention is detailed hereinafter by means of the embodiments. The following embodiments are described by taking the R-PDSCH starting symbol position as an example.

Embodiment 1

In this embodiment, suppose the relay node reports the PDCCH symbol number used by the access link, for instance, the relay node carries 1 bit of dedicated information on the common PRB, through the PDCCH symbol number used by the access link that is reported by the bit, the base station at this time can obtain the PDCCH symbol number used by the access link corresponding to various relay nodes;

In this embodiment, suppose the solution to the starting position of the control information of the relay node is that the R-PDCCH starts from the 5th OFDM symbol when the number of the downlink resource blocks is no more than 10, otherwise the R-PDCCH starts from the 4th OFDM symbol. If R-DCI is used to directly indicate the relay link boundary (take the starting symbol position of R-PDSCH as an example), wherein R-DCI includes R-DL grant and R-UL grant, preferably, 2 bits of indication information are carried on the R-DL grant, the 2 bits of indication information at this time indicate the starting symbol position of R-PDSCH.

Figure 5:
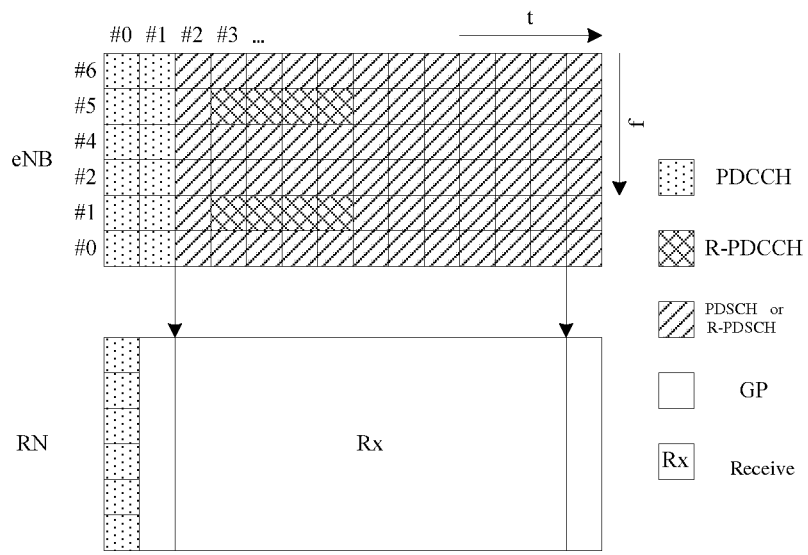
FIG. 5 is a schematic view of the starting position of an R-PDSCH according to the embodiments of the present invention.

For instance, when the switching of the relay node from transmission state to receiving state or the switching from access link control domain to relay link leads to the failure of use of some OFDM symbol at switching boundary position, as shown in FIG. 5, the 2nd OFDM symbol of the relay link requires the switching from transmission state to receiving state or the switching from access link control domain to relay link to the relay node. At this time, the indication principles of the 2 bits of indication information are as shown in Table 1, wherein OFDM symbols are numbered from "0", for example, "#0" means the 1st OFDM symbol, preferably, 2-bit "01" means that the starting symbol position of R-PDSCH is the 3rd OFDM symbol, "10" means the starting symbol position of R-PDSCH is the 4th OFDM symbol, "11" means the starting symbol position of R-PDSCH is the 5th OFDM symbol, wherein FIG. 5 shows the situation of 2-bit "01". Preferably, any bit combination of the 2-bit ("00", "01", "10" and "11") can be used to indicate the starting symbol position of R-PDSCH. The details will not be repeated herein anymore. For instance, in this embodiment, 2-bit "00" means that the starting symbol position of R-PDSCH is the 3rd OFDM symbol, "01" means the starting symbol position of R-PDSCH is the 4th OFDM symbol, "10" means the starting symbol position of R-PDSCH is the 5th OFDM symbol, wherein FIG. 5 shows the situation of 2-bit "00".

TABLE 1

| PDCCH symbol number of direct link | PDCCH symbol number of access link | GP | Starting symbol position of R-PDCCH | Starting symbol position of R-PDSCH |
|---|---|---|---|---|
| $N_{RB}^{DL} > 10$ | | | | |
| 1 | 1 | 2nd (#1) | 4th (#3) | 3rd (#2) |
| 2 | 1 | 2nd (#1) | 4th (#3) | 3rd (#2) |
| 3 | 1 | 2nd (#1) | 4th (#3) | 4th (#3) |
| 1 | 2 | 3rd (#2) | 4th (#3) | 4th (#3) |
| 2 | 2 | 3rd (#2) | 4th (#3) | 4th (#3) |
| 3 | 2 | 3rd (#2) | 4th (#3) | 4th (#3) |
| $N_{RB}^{DL} \leq 10$ | | | | |
| 2 | 1 | 2nd (#1) | 5th (#4) | 3rd (#2) |
| 3 | 1 | 2nd (#1) | 5th (#4) | 4th (#3) |
| 4 | 1 | 2nd (#1) | 5th (#4) | 5th (#4) |
| 2 | 2 | 3rd (#2) | 5th (#4) | 4th (#3) |
| 3 | 2 | 3rd (#2) | 5th (#4) | 4th (#3) |
| 4 | 2 | 3rd (#2) | 5th (#4) | 5th (#4) |

Figure 6:
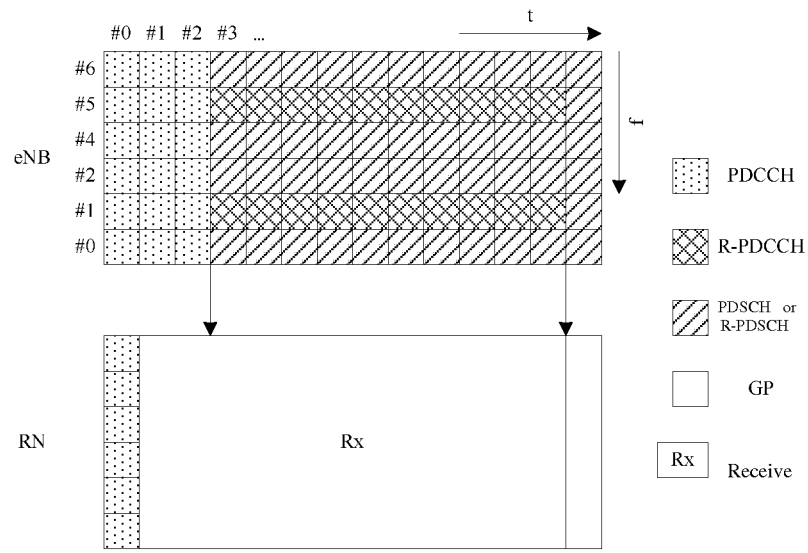
FIG. 6 is a schematic view of the starting position of another R-PDSCH according to the embodiments of the present invention.

For instance, when the switching of the relay node from transmission state to receiving state or the switching from access link control domain to relay link does not lead to the failure of use of some OFDM symbol at switching boundary position, as shown in FIG. 6, the 2nd or 3rd OFDM symbol of the relay node is not used for the switching from transmission state to receiving state or the switching from access link control domain to relay link to the relay node. At this time, the indication principles of the 2 bits of indication information are as shown in Table 2, wherein OFDM symbols are numbered from "0", for example, "#0" means the 1st OFDM symbol, "N/A" means that some OFDM symbol at the switching boundary position is still usable when the relay node switches from transmission state to receiving state or from access link control domain to relay link, when the number of the downlink resource blocks is more than 10, preferably, 2-bit "01" means that the starting symbol position of R-PDSCH is the 2nd OFDM symbol, "10" means the starting symbol position of R-PDSCH is the 3rd OFDM symbol, "11" means the starting symbol position of R-PDSCH is the 4th OFDM symbol; when the number of the downlink resource blocks is no more than 10, preferably, 2-bit "01" means that the starting symbol position of R-PDSCH is the 3rd OFDM symbol, "10" means the starting symbol position of R-PDSCH is the 4th OFDM symbol, "11" means the starting symbol position of R-PDSCH is the 5th OFDM symbol, wherein FIG. 6 shows the situation of 2-bit "10" when the number of the downlink resource blocks is less than 10.

TABLE 2

| PDCCH symbol number of direct link | PDCCH symbol number of access link | GP | Starting symbol position of R-PDCCH | Starting symbol position of R-PSCH |
|---|---|---|---|---|
| $N_{RB}^{DL} > 10$ | | | | |
| 1 | 1 | N/A | 4th (#3) | 2nd (#1) |
| 2 | 1 | N/A | 4th (#3) | 3rd (#2) |
| 3 | 1 | N/A | 4th (#3) | 4th (#3) |
| 1 | 2 | N/A | 4th (#3) | 3rd (#2) |
| 2 | 2 | N/A | 4th (#3) | 3rd (#2) |
| 3 | 2 | N/A | 4th (#3) | 4th (#3) |
| $N_{RB}^{DL} \leq 10$ | | | | |
| 2 | 1 | N/A | 5th (#4) | 3rd (#2) |
| 3 | 1 | N/A | 5th (#4) | 4th (#3) |
| 4 | 1 | N/A | 5th (#4) | 5th (#4) |
| 2 | 2 | N/A | 5th (#4) | 3rd (#2) |
| 3 | 2 | N/A | 5th (#4) | 4th (#3) |
| 4 | 2 | N/A | 5th (#4) | 5th (#4) |

Embodiment 2

Suppose the relay node reports the PDCCH symbol number used by the access link, and the relay node carries 1 bit of dedicated information on the service packet, the base station at this time can obtain the PDCCH symbol number used by the access link corresponding to various relay nodes;

Suppose the solution to the starting position of the control information of the relay node is that the R-PDCCH starts from the 4th or 5th OFDM symbol (take the 4th OFDM symbol as an example) in all cases, if R-DCI (Relay link-Downlink Control Information) is used to directly indicate the relay link boundary (take the starting symbol position of R-PDSCH as an example), wherein R-DCI includes R-DL grant and R-UL grant, preferably, 2 bits of indication information are carried on the R-DL grant, the 2 bits of indication information at this time indicate the starting symbol position of R-PDSCH.

For instance, when the switching of the relay node from transmission state to receiving state or the switching from access link control domain to relay link leads to the failure of use of some OFDM symbol at switching boundary position, as shown in FIG. 5, the 2nd OFDM symbol of the relay node requires the switching from transmission state to receiving state or the switching from access link control domain to relay link to the relay node. At this time, the indication principles of the 2 bits of indication information are as shown in Table 3, wherein OFDM symbols are numbered from "0", for example, "#0" means the 1st OFDM symbol, preferably, 2-bit "01" means that the starting symbol position of R-PDSCH is the 3rd OFDM symbol, "10" means the starting symbol position of R-PDSCH is the 4th OFDM symbol, wherein FIG. 5 shows the situation of 2-bit "01".

TABLE 3

| PDCCH symbol number of direct link | PDCCH symbol number of access link | GP | Starting symbol position of R-PDCCH | Starting symbol position of R-PDSCH |
|---|---|---|---|---|
| $N_{RB}^{DL} > 10$ | | | | |
| 1 | 1 | 2nd (#1) | 4th (#3) | 3rd (#2) |
| 2 | 1 | 2nd (#1) | 4th (#3) | 3rd (#2) |
| 3 | 1 | 2nd (#1) | 4th (#3) | 4th (#3) |
| 1 | 2 | 3rd (#2) | 4th (#3) | 4th (#3) |
| 2 | 2 | 3rd (#2) | 4th (#3) | 4th (#3) |

TABLE 3-continued

| PDCCH symbol number of direct link | PDCCH symbol number of access link | GP | Starting symbol position of R-PDCCH | Starting symbol position of R-PDSCH |
|---|---|---|---|---|
| 3 | 2 | 3rd (#2) | 4th (#3) | 4th (#3) |
| $N_{RB}^{DL} \leq 10$ | | | | |
| 2 | 1 | 2nd (#1) | 4th (#3) | 3rd (#2) |
| 3 | 1 | 2nd (#1) | 4th (#3) | 4th (#3) |
| 2 | 2 | 3rd (#2) | 4th (#3) | 4th (#3) |
| 3 | 2 | 3rd (#2) | 4th (#3) | 4th (#3) |

For instance, when the switching of the relay node from transmission state to receiving state or the switching from access link control domain to relay link does not lead to the failure of use of some OFDM symbol in switching boundary position, as shown in FIG. 6, the 2nd or 3rd OFDM symbol of the relay node is not used for the switching from transmission state to receiving state or the switching from access link control domain to relay link to the relay node. At this time, the indication principles of the 2 bits of indication information are as shown in Table 4, wherein OFDM symbols are numbered from "0", for example, "#0" means the 1st OFDM symbol, "N/A" means that some OFDM symbol at the switching boundary position is still usable when the relay node switches from transmission state to receiving state or from access link control domain to relay link, when the number of the downlink resource blocks is more than 10, preferably, 2-bit "01" means that the starting symbol position of R-PDSCH is the 2nd OFDM symbol, "10" means the starting symbol position of R-PDSCH is the 3rd OFDM symbol, "11" means the starting symbol position of R-PDSCH is the 4th OFDM symbol; when the number of the downlink resource blocks is less than 10, preferably, 2-bit "01" means that the starting symbol position of R-PDSCH is the 3rd OFDM symbol, "10" means the starting symbol position of R-PDSCH is the 4th OFDM symbol, wherein FIG. 6 shows the situation of 2-bit "10" when the number of the downlink resource blocks is less than 10.

TABLE 4

| PDCCH symbol number of direct link | PDCCH symbol number of access link | GP | Starting symbol position of R-PDCCH | Starting symbol position of R-PDSCH |
|---|---|---|---|---|
| $N_{RB}^{DL} > 10$ | | | | |
| 1 | 1 | N/A | 4th (#3) | 2nd (#1) |
| 2 | 1 | N/A | 4th (#3) | 3rd (#2) |
| 3 | 1 | N/A | 4th (#3) | 4th (#3) |
| 1 | 2 | N/A | 4th (#3) | 3rd (#2) |
| 2 | 2 | N/A | 4th (#3) | 3rd (#2) |
| 3 | 2 | N/A | 4th (#3) | 4th (#3) |
| $N_{RB}^{DL} \leq 10$ | | | | |
| 2 | 1 | N/A | 4th (#3) | 3rd (#2) |
| 3 | 1 | N/A | 4th (#3) | 4th (#3) |
| 2 | 2 | N/A | 4th (#3) | 3rd (#2) |
| 3 | 2 | N/A | 4th (#3) | 4th (#3) |

Embodiment 3

In this embodiment, suppose the relay node reports the PDCCH symbol number used by the access link, and the relay node carries 1 bit of dedicated information on the service packet, the base station at this time can obtain the PDCCH symbol number used by the access link corresponding to various relay nodes;

Suppose the solution to the starting position of the control information of the relay node is that the R-PDCCH starts from the 4th OFDM symbol in all cases, if R-DCI scrambling is used to indicate the relay link boundary (take the starting symbol position of R-PDSCH as an example), preferably "Exclusive OR" operation is conducted between the 1 bit of indication information and the lowest digit of RN-ID, the 1 bit of indication information and the PDCCH symbol number used by the access link at this time jointly indicate the starting symbol position of R-PDSCH.

For instance, when the switching of the relay node from transmission state to receiving state or the switching from access link control domain to relay link leads to the failure of use of some OFDM symbol in switching boundary position, as shown in FIG. 5, the 2nd OFDM symbol of the relay node requires the switching from transmission state to receiving state or the switching from access link control domain to relay link to the relay node. At this time, the indication principles of 1 bit of indication information are as shown in Table 5, wherein OFDM symbols are numbered from "0", for example, "#0" means the 1st OFDM symbol.

Preferably:

1-bit "0" and the PDCCH symbol number "1" used by the access link jointly indicate that the starting symbol position of R-PDSCH is the 3rd OFDM symbol;

1-bit "1" and the PDCCH symbol number "1" used by the access link jointly indicate that the starting symbol position of R-PDSCH is the 4th OFDM symbol;

1-bit "0" or "1" and the PDCCH symbol number "2" used by the access link jointly indicate that the starting symbol position of R-PDSCH is the 4th OFDM symbol, then it is believed irrelevant to the indication information;

FIG. 5 shows the situation of the joint indication of 1-bit "0" and PDCCH symbol number "1" used by the access link.

boundary position is still usable when the relay node switches from transmission state to receiving state or from access link control domain to relay link.

When the number of the downlink resource blocks is more than 10, preferably:

1-bit "0" and the PDCCH symbol number "1" used by the access link jointly indicate that the starting symbol position of R-PDSCH is the 3rd or 2nd OFDM symbol;

1-bit "1" and the PDCCH symbol number "1" used by the access link jointly indicate that the starting symbol position of R-PDSCH is the 4th OFDM symbol;

1-bit "0" and the PDCCH symbol number "2" used by the access link jointly indicate that the starting symbol position of R-PDSCH is the 3rd OFDM symbol;

1-bit "1" and the PDCCH symbol number "2" used by the access link jointly indicate that the starting symbol position of R-PDSCH is the 4th OFDM symbol;

When the number of the downlink resource blocks is no more than 10, preferably:

1-bit "0" and the PDCCH symbol number "1" used by the access link jointly indicate that the starting symbol position of R-PDSCH is the 3rd OFDM symbol;

1-bit "1" and the PDCCH symbol number "1" used by the access link jointly indicate that the starting symbol position of R-PDSCH is the 4th OFDM symbol;

1-bit "0" and the PDCCH symbol number "2" used by the access link jointly indicate that the starting symbol position of R-PDSCH is the 3rd OFDM symbol;

1-bit "1" and the PDCCH symbol number "2" used by the access link jointly indicate that the starting symbol position of R-PDSCH is the 4th OFDM symbol;

FIG. 6 shows the situation of the joint indication of 1-bit "1" and PDCCH symbol number "1" used by the access link when the number of the downlink resource blocks is less than 10.

TABLE 5

| PDCCH symbol number of direct link | PDCCH symbol number of access link | GP | Starting symbol position of R-PDCCH | Starting symbol position of R-PDSCH |
|---|---|---|---|---|
| $N_{RB}^{DL} > 10$ | | | | |
| 1 | 1 | 2nd (#1) | 4th (#3) | 3rd (#2) |
| 2 | 1 | 2nd (#1) | 4th (#3) | 3rd (#2) |
| 3 | 1 | 2nd (#1) | 4th (#3) | 4th (#3) |
| 1 | 2 | 3rd (#2) | 4th (#3) | 4th (#3) |
| 2 | 2 | 3rd (#2) | 4th (#3) | 4th (#3) |
| 3 | 2 | 3rd (#2) | 4th (#3) | 4th (#3) |
| $N_{RB}^{DL} \leq 10$ | | | | |
| 2 | 1 | 2nd (#1) | 4th (#3) | 3rd (#2) |
| 3 | 1 | 2nd (#1) | 4th (#3) | 4th (#3) |
| 2 | 2 | 3rd (#2) | 4th (#3) | 4th (#3) |
| 3 | 2 | 3rd (#2) | 4th (#3) | 4th (#3) |

For instance, when the switching of the relay node from transmission state to receiving state or the switching from access link control domain to relay link does not lead to the failure of use of some OFDM symbol in switching boundary position, as shown in FIG. 6, the 2nd or 3rd OFDM symbol of the relay node is not used for the switching from transmission state to receiving state or the switching from access link control domain to relay link to the relay node. At this time, the indication principles of 1 bit of indication information are as shown in Table 6, wherein OFDM symbols are numbered from "0", for example, "#0" means the 1st OFDM symbol, "N/A" means that some OFDM symbol at the switching

TABLE 6

| PDCCH symbol number of direct link | PDCCH symbol number of access link | GP | Starting symbol position of R-PDCCH | Starting symbol position of R-PDSCH |
|---|---|---|---|---|
| $N_{RB}^{DL} > 10$ | | | | |
| 1 | 1 | N/A | 4th (#3) | 3rd (#2), 2nd (#1), 3rd (#2) |
| 2 | 1 | N/A | 4th (#3) | 3rd (#2), 4th (#3), 4th (#3) |
| 3 | 1 | N/A | 4th (#3) | 4th (#3), 4th (#3), 4th (#3) |
| 1 | 2 | N/A | 4th (#3) | 3rd (#2), 3rd (#2), 3rd (#2) |
| 2 | 2 | N/A | 4th (#3) | 3rd (#2), 3rd (#2), 3rd (#2) |
| 3 | 2 | N/A | 4th (#3) | 4th (#3), 4th (#3), 4th (#3) |
| $N_{RB}^{DL} \leq 10$ | | | | |
| 2 | 1 | N/A | 4th (#3) | 3rd (#2) |
| 3 | 1 | N/A | 4th (#3) | 4th (#3) |
| 2 | 2 | N/A | 4th (#3) | 3rd (#2) |
| 3 | 2 | N/A | 4th (#3) | 4th (#3) |

Embodiment 4

In this embodiment, when R-PDCCH is included within some resource block, if the resource block carries R-PDSCH, the starting position of R-PDSCH at this time is the same with the sub-definition in Embodiments 1, 2, 3 and 9; if the residual OFDM symbols in time direction within the subframe also carry R-PDSCH, the R-PDSCH carried by the residual OFDM symbols is connected with the ending position of R-PDCCH (as shown in FIG. 5,  and  are connected with each other in time direction). Preferably, the starting position corresponding to R-PDSCH carried by the residual OFDM symbols refers to the 1st OFDM symbol of the 2nd slot;

when R-PDCCH is included within some resource block, if the resource block does not carry R-PDSCH, the starting position of R-PDSCH is different from the sub-definition in Embodiments 1, 2, 3 and 9; if the residual OFDM symbols in time direction within the subframe also carry R-PDSCH, the starting position of R-PDSCH and the ending position of R-PDCCH are connected with each other (as shown in FIG. 5,  and  are connected with each other in time direction) at this time. Preferably, the starting position corresponding to the R-PDSCH carried by the residual OFDM symbols refers to the 1st OFDM symbol of the 2nd slot;

when R-PDCCH is not included within some resource block, if the resource block carries R-PDSCH, the starting position of R-PDSCH at this time is the same with the sub-definition in Embodiments 1, 2, 3 and 9.

Embodiment 5

In this embodiment, suppose the relay node fixes the PDCCH symbol number used by the access link in the time division mode and the system contains 6 RNs, the change interval is any integral multiple of 10 ms, for example, 40 ms. When the starting positions are the same, if the PDCCH symbol number configured by RN1, RN2 and RN3 at the starting position of the subframe #0 of the radio frame #0 and used by the access link is "1", the PDCCH symbol number configured by RN4, RN5 and RN6 at the starting position of the subframe #0 of the radio frame #0 and used by the access link is "2", after changing the interval to 40 ms, the PDCCH symbol number configured by RN1, RN2 and RN3 at the starting position of the subframe #0 of the radio frame #0 and used by the access link is "2", the PDCCH symbol number configured by RN4, RN5 and RN6 at the starting position of the subframe #0 of the radio frame #0 and used by the access link is "1";

when the starting positions are different, if the RDCCH symbol number configured by RN1, RN2 and RN3 at the starting position of the subframe #0 of the radio frame #0 and used by the access link is "1", the PDCCH symbol number configured by RN4, RN5 and RN6 at the starting position of the subframe #5 of the radio frame #0 and used by the access link is "2", after changing the interval to 40 ms, the RDCCH symbol number configured by RN1, RN2 and RN3 at the starting position of the subframe #0 of the radio frame #4 and used by the access link is "2", the PDCCH symbol number configured by RN4, RN5 and RN6 at the starting position of the subframe #5 of the radio frame #4 and used by the access link is "1".

Embodiment 6

In the embodiment, the indication information can use the encoding method of (3, 2) or (3, 1) repeat encoding and then adding the original information. If the indication information is 2-bit "01" conducting (3, 2) encoding as "001", the repetition code can be obtained by repeating the encoding for n times; if repeating the encoding for 10 times, the repetition code is "011011011011011011011011011011", then after adding 2 bits of original information, the code is "01101101101101101101101101101101", similarly, "10" conducting (3, 2) encoding as "101", "11" conducting (3, 2) encoding as "110"; if the indication information is 1-bit "0" conducting (3, 2) encoding as "011" and the encoding is repeated for 9 times, the repetition code is "011011011011011011011011011" and after adding 1 bit of the original information, the code is "0110110110110110110110110110", similarly, "1" conducting (3, 1) encoding as "101".

The bits encoded can conduct the modulation methods such as OPSK, 16QAM, 64QAM and 256QAM, and map onto the corresponding physical resource after modulation or multi-antennae processing.

Figure 7:
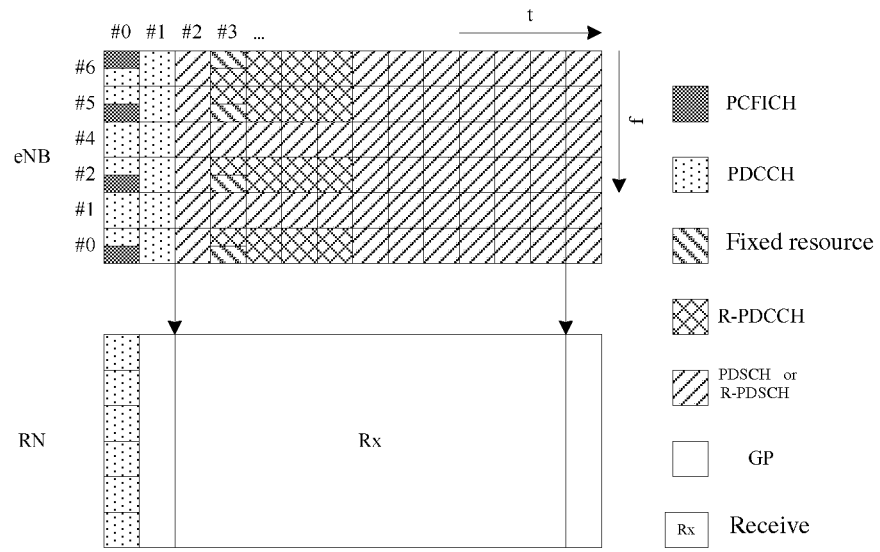
FIGS. 7 and 8 are schematic views of the fixed physical resource mapping according to the embodiments of the present invention.

Suppose the solution to the starting position of the control information of the relay node is that the R-PDCCH starts from the 4th or 5th OFDM symbol (take the 4th OFDM symbol as an example), when the base station carries the indication information by means of fixed physical resource, the indication information is mapped onto the 4th OFDM symbol in the time direction, and that is mapped onto the frequency resource corresponding to the PCFICH in frequency direction, as shown in FIG. 7, the frequency resource of  corresponding to  is the same; or, regard the frequency resource available to R-PDCCH as logic continuation and the indication information is uniformly distributed to the frequency resource scope available, for example, the number of the resource blocks available to R-PDCCH is 16 and the indication information is uniformly distributed onto the 16 resource blocks, for instance, the indication information is mapped onto the 1st, 5th, 9th and 13th resource blocks available, the 1st, 5th, 9th and 13th resource blocks make the 16 resource blocks uniformly distributed.

Embodiment 7

In this embodiment, the base station reaches an agreement with the RN for the stating position of R-PDSCH, namely, the RN fixes the starting OFDM symbol position of R-PDSCH.

Preferably, the specific fixed starting OFDM symbol of R-PDSCH and that of R-PDCCH are the same, for example, when the number of the downlink resource blocks is no more than 10, the R-PDCCH starts from the 5th OFDM symbol, otherwise the R-PDCCH starts from the 4th OFDM symbol, at this time, when the number of the downlink resource blocks is no more than 10, the R-PDSCH starts from the 5th OFDM symbol, otherwise the R-PDSCH starts from the 4th OFDM symbol; for instance, the R-PDCCH starts from the 4th OFDM symbol in all cases, then the R-PDSCH starts from the starts from the 4th OFDM symbol in all cases; if the R-PDCCH starts from the 5th OFDM symbol in all cases, the R-PDSCH starts from the 5th OFDM symbol in all cases.

Preferably, the specific fixed starting OFDM symbol of R-PDSCH is different from that of R-PDCCH, for example, when the number of the downlink resource blocks is no more than 10, the R-PDCCH starts from the 5th OFDM symbol, otherwise the R-PDCCH starts from the 4th OFDM symbol, at this time, the R-PDSCH starts from the 4th or 5th OFDM symbol in all cases; for example, the R-PDCCH starts from the 4th OFDM symbol in all cases, at this time, when the number of the current downlink resource blocks is no more than 10, the R-PDSCH starts from the 5th OFDM symbol, otherwise the R-PDSCH starts from the 4th OFDM symbol or the R-PDSCH starts from the 5th OFDM symbol in all cases; for instance, the R-PDCCH starts from the 5th OFDM symbol in all cases, at this time, when the number of the current downlink resource blocks is no more than 10, the R-PDSCH starts from the starts from the 5th OFDM symbol, otherwise the R-PDSCH starts from the 4th OFDM symbol, or the R-PDSCH starts from the 4th OFDM symbol in all cases.

Embodiment 8

In this embodiment, the base station indicates the starting OFDM symbol of R-PDSCH implicitly, for instance, indicates it by means of CCE index or resource block index.

For instance, the CCE index or the downlink distributed resource block index or the uplink distributed resource block index corresponding to RN conducts Mode 4 or 3 or 2 operation to obtain the position of the starting OFDM symbol of R-PDSCH. For example, suppose the system needs similar 2-bit direct indication or joint indication (4 kinds of R-PDSCH starting positions), then Mode 4 operation will be conducted; if the system needs similar 2-bit direct indication or joint indication (3 kinds of R-PDSCH starting positions), Mode 3 operation will be conducted; if the system needs similar 1-bit direct indication or joint indication (2 kinds of R-PDSCH starting positions), Mode 2 operation will be conducted. If there are 3 kinds of R-PDSCH starting positions in total, the CCE index of some RN=5, mod(CCE_index, 3)=2, corresponding to the meaning of 2-bit "11" mode, similarly, the model value after modular arithmetic is "0", corresponding to the meaning of 2-bit "01", the model value after modular arithmetic is "1", corresponding to the meaning of 2-bit "10". If there are 2 kinds of R-PDSCH starting positions in total, the DL PRB index of some RN=2, mod(DL PRB index, 2)=0, corresponding to the meaning of 1-bit "0", similarly, the model value after modular arithmetic is "1", corresponding to the meaning of 1-bit "1".

Embodiment 9

In this embodiment, suppose the solution to the starting position of the control information of the relay node is that the R-PDCCH starts from the 4th or 5th OFDM symbol (take the 4th OFDM symbol as an example) in all cases. Indicate the relay link boundary (take the starting symbol position of R-PDSCH as an example) by means of high-level signaling (such as the Backhaul-DL-starting symbol), preferably, the 2 bits of indication information is carried on the high-level signaling, at this time, the 2 bits of indication information indicate the starting symbol position of R-PDSCH. Preferably, the transmission method of the high-level signaling includes one of the following: transmit the high-level signaling through the common information of R-PBCH; transmit the high-level signaling through the common information of R-SIB; transmit the high-level signaling through the common information of RRC signaling; and transmit the high-level signaling through dedicated information of RRC information.

For instance, when the switching of the relay node from transmission state to receiving state or the switching from access link control domain to relay link leads to the failure of use of some OFDM symbol in switching boundary position, as shown in FIG. 5, the 2nd OFDM symbol of the relay link requires the switching from transmission state to receiving state or the switching from access link control domain to relay link to the relay node. At this time, the indication principles of the 2 bits of indication information are as shown in Table 3, wherein OFDM symbols are numbered from "0", for example, "#0" means the 1st OFDM symbol, preferably, 2-bit "01" means that the starting symbol position of R-PDSCH is the 3rd OFDM symbol of the 1st slot, "10" means the starting symbol position of R-PDSCH is the 4th OFDM symbol of the 1st slot, wherein FIG. 5 shows the situation of 2-bit "01". Or preferably, 2-bit "10" means that the starting symbol position of R-PDSCH is the 3rd OFDM symbol of the 1st slot, "11" means the starting symbol position of R-PDSCH is the 4th OFDM symbol of the 1st slot, wherein FIG. 5 shows the shows the situation of 2-bit "10".

Figure 8:
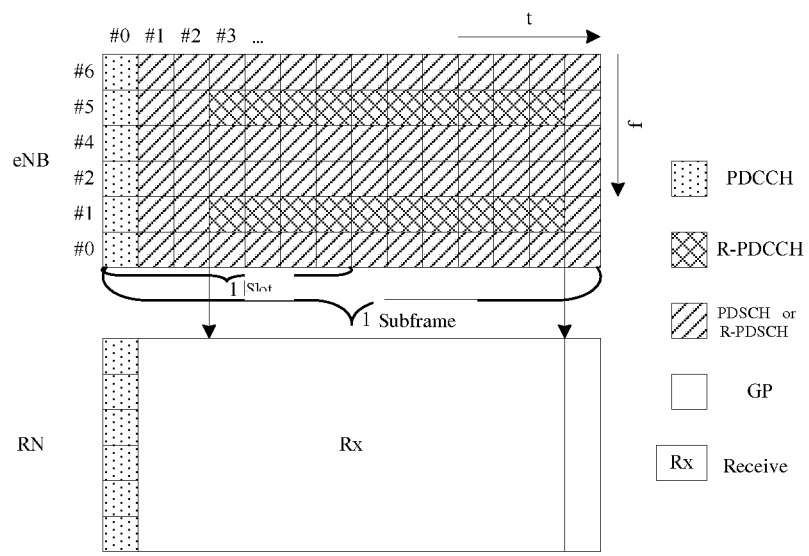

For instance, when the switching of the relay node from transmission state to receiving state or the switching from access link control domain to relay link does not lead to the failure of use of some OFDM symbol in switching boundary position, as shown in FIG. 8, the 2nd or 3rd OFDM symbol of the relay link is not used for the switching from transmission state to receiving state or the switching from access link control domain to relay link to the relay node. At this time, the indication principles of the 2 bits of indication information are as shown in Table 4, wherein OFDM symbols are numbered from "0", for example, "#0" means the 1st OFDM symbol, "N/A" means that some OFDM symbol at the switching boundary position is still usable when the relay node switches from transmission state to receiving state or from access link control domain to relay link, preferably, 2-bit "00" means that the starting symbol position of R-PDSCH is the 2nd OFDM symbol of the 1st slot, "01" means the starting symbol position of R-PDSCH is the 3rd OFDM symbol of the 1st slot, "10" means the starting symbol position of R-PDSCH is the 4th OFDM symbol of the 1st slot, wherein FIG. 8 shows the situation of 2-bit "00". (Or, preferably, 2-bit "01" means that the starting position of R-PDCH is the 2nd OFDM symbol of the 1st slot, "10" means the starting symbol position of R-PDSCH is the 3rd OFDM symbol of the 1st slot, "11" means that the starting symbol position of R-PDSCH is the 4th OFDM symbol of the 1st slot, wherein FIG. 8 shows the shows the situation of 2-bit "01".)

To sum up, preferably, 2-bit "00" means that the starting position of R-PDSCH is the 2nd OFDM symbol of the 1st slot (the OFDM symbol whose number is #1), "01" means that the starting position of R-PSCH is the 3rd OFDM symbol of the 1st slot (the OFDM symbol whose number is #2), "10" means the starting symbol position of R-PDSCH is the 4th OFDM symbol of the 1st slot (the OFDM symbol whose number is #3); or, preferably, 2-bit "01" means that the starting position of R-PDSCH is the 2nd OFDM symbol of the 1st slot (the OFDM symbol whose number is #1), "10" means the starting symbol position of R-PDSCH is the 3rd OFDM symbol of the 1st slot (the OFDM symbol whose number is #2), "11" means that the 4th OFDM symbol of the 1st slot (the OFDM symbol whose number is #3).

It shall be noted from the description above that, through the technical method provided in the embodiments of the present invention, the indication of relay link boundary can be ideally applied to the base station to the relay node, which features lowered signaling overhead and improved utilization rate of the relay link resource, thus not only ensuring the backward compatibility (compatible with LTE system), but also addressing the problem of the indication of the relay link boundary.

It is obvious for the person skilled in this art that, the modules or steps of the present invention can be also realized by a general computer device. They can be integrated in a single computer device or distributed on the network composed of several computer devices, or alternatively achieved by executable codes of a computer device, so as to store them in a storage unit for execution by a computer device, or in some cases, implement the steps shown or described herein in different order, or make them into different integrated circuit modules or make multiple modules or steps of them to a single integrated circuit module for realization of the present invention. In this way, the present invention is not restricted to the combination of any specific hardware and software.

Above description is only to illustrate the preferred embodiments but not to limit the present invention, which is subject to alteration and change for the person skilled in this art. Any such change, equivalent substitution or improvement made within the spirit and principle of the present invention should be covered in the protection scope of the present invention.

What is claimed is:

1. A method for indicating a relay link boundary, comprising the steps of:
    a base station indicating, to a relay node, the relay link boundary corresponding to the relay node; and
    the relay node determining the relay link boundary according to the indication of the base station,
    wherein the relay link boundary is a starting position of resource available to other relay links except that of R-PDCCH.

2. The method according to claim 1, wherein the step of the base station indicating the relay link boundary corresponding to the relay node further comprises: the base station transmitting indication information to the relay node to indicate the relay link boundary by means of the indication information, wherein the indication information indicates a OFDM symbol position corresponding to the relay link boundary.

3. The method according to claim 1, wherein the step of the base station indicating the relay link boundary corresponding to the relay node further comprises: the base station transmitting indication information to the relay node, and the indication information and a Physical Downlink Control Channel (PDCCH) symbol number used by an access link of the relay node are used to indicate the relay link boundary, wherein the indication information and the PDCCH symbol number jointly indicate a OFDM symbol position corresponding to the relay link boundary.

4. The method according to claim 2, wherein the step of the base station transmitting the indication information to the relay node further comprises: the base station transmitting the indication information to the relay node by carrying it in a high-level signaling to the relay node.

5. The method according to claim 4, wherein the step of the base station transmitting the high-level signaling to the relay node further includes:
    the base station transmitting the high-level signaling through common information of Relay link-Downlink Broadcast Information (R-PBCH);
    the base station transmitting the high-level signaling through common information of Relay link-System Information Block (R-SIB);
    the base station transmitting the high-level signaling through common information of Radio Resource Control (RRC) signaling; and
    the base station transmitting the high-level signaling through dedicated information of the RRC information.

6. The method according to claim 2, wherein the step of the base station transmitting the indication information to the relay node further includes: the base station transmitting the indication information to the relay node by carrying it in Relay link-Downlink Control Information (R-DCI) of the relay link.

7. The method according to claim 2, wherein the step of the base station transmitting the indication information to the relay node further includes: the base station transmitting the indication information to the relay node on a predetermined physical resource.

8. The method according to claim 7, wherein the step of the base station transmitting the indication information to the relay node on the predetermined physical resource further includes: the base station carrying the indication information on a predetermined frequency resource of an Orthogonal Frequency Division Multiplexing (OFDM) symbol whose starting position is the same with that of the PDCCH of the relay link.

9. The method according to claim 8, wherein a mapping method of the predetermined frequency resource is determined by a frequency resource mapping method of the Physical Control Format Indicator Channel (PCFICH) of a link from the base station to a user equipment, or the indication information is uniformly distributed within a frequency resource scope available to the R-PDCCH of the relay link.

10. The method according to claim 2, wherein the step of the base station transmitting the indication information to the relay node further includes: the base station using the indication information to scramble a node identification of the relay node, and transmitting the scrambled node identification to the relay node.

11. The method according to claim 10, wherein the step of the base station using the indication information to scramble the node identification of the relay node further includes: the base station conducting a bit-level "Exclusive OR" operation between the indication information and the node identification.

12. The method according to claim 2, wherein the step of the base station transmitting the indication information to the relay node further includes: when the base station allocates resource blocks or R-DCI for the relay node, the resource blocks or R-DCI transmitted to the relay node indicate the indication information through indexes of the resource blocks or indexes of the Control Channels Elements (CCE).

13. The method according to claim 3, wherein the PDCCH symbol number is configured by the base station; the method also including: the base station transmitting, to the relay node, an identification indicating the PDCCH symbol number.

14. The method according to claim 13, wherein the step of the base station transmitting the identification to the relay node includes one of the following:
    the base station transmitting the identification through common information of the R-PBCH;
    the base station transmitting the identification through common information of the R-SIB;
    the base station transmitting the identification through common information of the RRC signaling; and
    the base station transmitting the identification through dedicated information of the RRC information.

15. The method according to claim 3, wherein the PDCCH symbol number is configured by the relay node; the method also including: the relay node reporting an identification indicating the PDCCH symbol number to the base station.

16. The method according to claim 15, wherein the step of the relay node reporting the identification indicating the PDCCH symbol number to the base station further includes: the relay node transmitting the identification through dedicated information of a common Physical Resource Block (PRB) or a service packet.

17. The method according to claim 16, wherein, if the relay node transmits the identification through the dedicated information of the common PRB, the method also including: the relay node reserving resource for carrying the identification by one of the following modes: FDM, CDM and TDM; the step of the relay node transmitting the identification through the dedicated information of the service packet includes one of the following: the relay node transmitting the identification by carrying it into a tail part of the service packet; and the relay node transmitting the identification by carrying it on a Media Access Control (MAC) layer; the relay node transmitting the identification by carrying on the RRC signaling.

18. The method according to claim 3, wherein the PDCCH symbol number is determined by the relay node according to a number of transmitting antennae of the relay node.

19. The method according to claim 3, wherein the PDCCH symbol number refers to the PDCCH symbol number used by a predetermined access link.

20. The method according to claim 3, wherein the PDCCH symbol number refers to the PDCCH symbol number used by the access link fixed by the relay node in a time division mode the method also including: the relay node changing the PDCCH symbol number used by the access link at a fixed change interval by taking a same or different subframe or radio frame as a starting point.

21. The method according to claim 1, wherein a starting position corresponding to the relay link boundary within a 2nd slot refers to a 1st OFDM symbol within the 2nd slot.

22. The method according to claim 1, wherein step of the base station indicating the relay link boundary corresponding to the relay node further includes: the base station reaching an agreement with the relay node for a OFDM symbol position corresponding to the relay link boundary.

23. A method for determining a relay link boundary, comprising: a relay node determining the relay link boundary corresponding to the relay node according to an indication from a base station or a prior agreement with the base station, wherein the relay link boundary is a starting position of resource available to other relay links except that of R-PDCCH.

24. The method according to claim 23, wherein the step of the relay node determining the relay link boundary according to the prior agreement reached with the base station in advance includes:
the relay node reaching an agreement with the base station that a starting position of the relay link is the same with that of the PDCCH of the relay link; and
the relay node determining the relay link boundary to be the starting position of the PDCCH.

25. A base station, comprising:
a determination module, used to determine a relay link boundary corresponding to a relay node, wherein the relay link boundary is a starting position of resource available to other relay links except that of R-PDCCH; and
an indication module, used to indicate the relay link boundary to the relay node.

26. The base station according to claim 25, wherein the indication module indicates the relay link boundary by one of the following means:
the indication module transmits indication information to the relay node, through which the relay link boundary is indicated;
the indication module transmits the indication information to the relay node, and the relay link boundary is indicated by the indication information together with a PDCCH symbol number used by an access link of the relay node; and
the indication module reaches an agreement with the relay node for a OFDM symbol position corresponding to the relay link boundary.

27. The base station according to claim 26, wherein the base station also includes:
a configuration module, used to configure the PDCCH symbol number used by the access link of the relay node;
a transmission module, used to transmit the identification for indicating the PDCCH symbol number configured by the configuration module to the relay node.

28. The method according to claim 3, wherein the step of the base station transmitting the indication information to the relay node further comprises: the base station transmitting the indication information to the relay node by carrying it in a high-level signaling to the relay node.

29. The method according to claim 3, wherein the step of the base station transmitting the indication information to the relay node further includes: the base station transmitting the indication information to the relay node by carrying it in Relay link-Downlink Control Information (R-DCI) of the relay link.

30. The method according to claim 3, wherein the step of the base station transmitting the indication information to the relay node further includes: the base station transmitting the indication information to the relay node on a predetermined physical resource.

31. The method according to claim 3, wherein the step of the base station transmitting the indication information to the relay node further includes: the base station using the indication information to scramble a node identification of the relay node, and transmitting the scrambled node identification to the relay node.

32. The method according to claim 3, wherein the step of the base station transmitting the indication information to the relay node further includes: when the base station allocates resource blocks or R-DCI for the relay node, the resource blocks or R-DCI transmitted to the relay node indicate the indication information through indexes of the resource blocks or indexes of the Control Channels Elements (CCE).

* * * * *